J. B. WEST.
BOND TESTER.
APPLICATION FILED FEB. 1, 1906.
957,020.
Patented May 3, 1910.
2 SHEETS—SHEET 1.
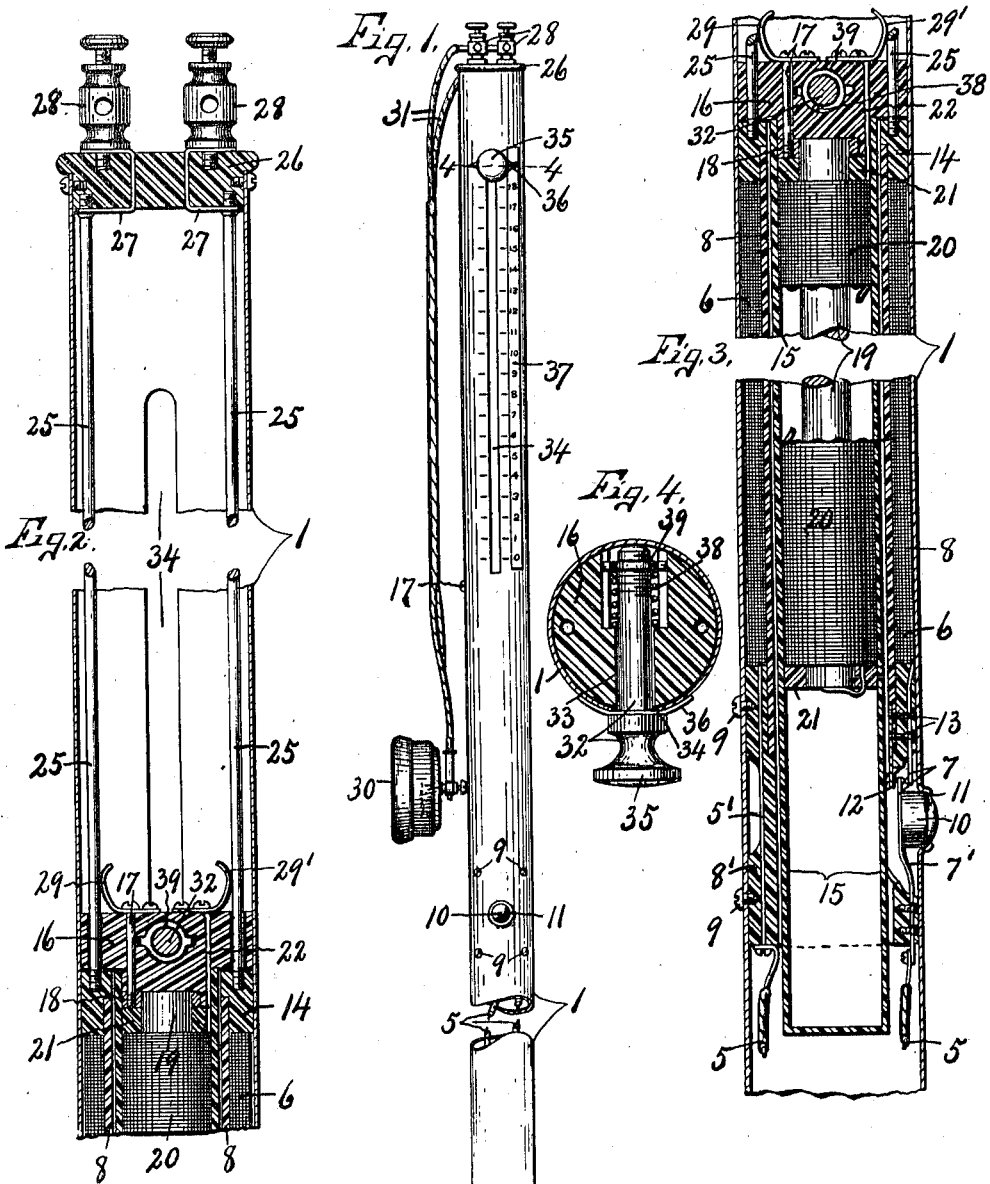
Witnesses:
J. E. Arthur
H. E. Chase
Inventor:
J. B. West
By Howard P. Denison
Atty.

J. B. WEST.
BOND TESTER.
APPLICATION FILED FEB. 1, 1906.
957,020.
Patented May 3, 1910.
2 SHEETS—SHEET 2.
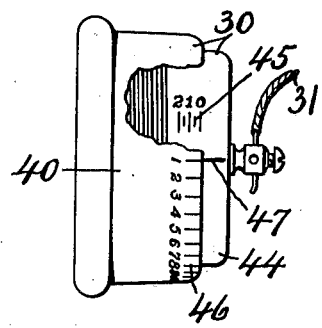
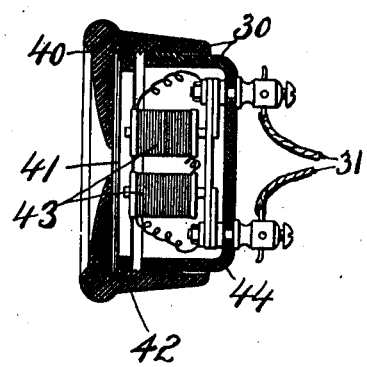
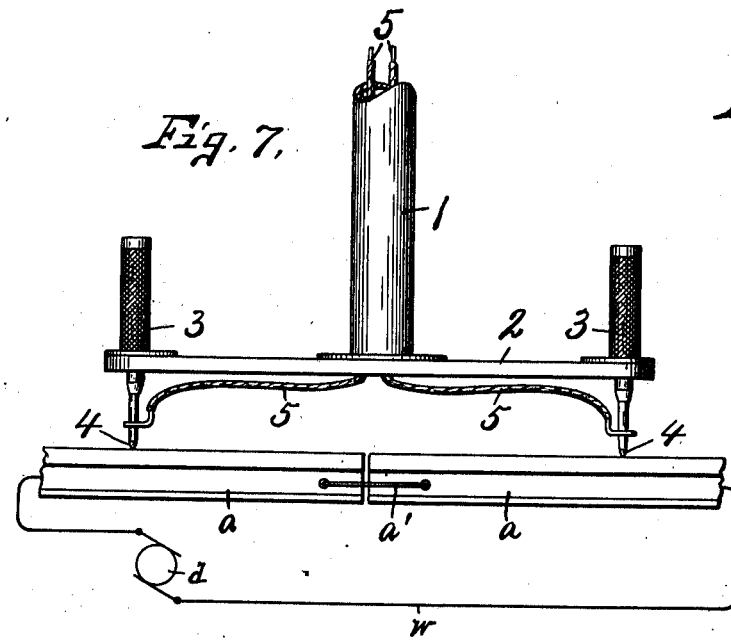
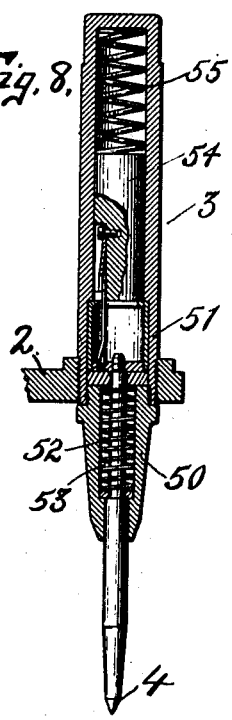
Witnesses.
Inventor.
John B. West
By
Howard P. Denison
Attorney.

UNITED STATES PATENT OFFICE.

JOHN B. WEST, OF SYRACUSE, NEW YORK.

BOND-TESTER.

957,020.   Specification of Letters Patent.   Patented May 3, 1910.

Application filed February 1, 1906. Serial No. 298,989.

*To all whom it may concern:*

Be it known that I, JOHN B. WEST, of Syracuse, in the county of Onondaga, in the State of New York, have invented new and useful Improvements in Bond-Testers, of which the following, taken in connection with the accompanying drawings, is a full, clear, and exact description.

This invention relates to certain improvements in bond-testers for testing the bonds and joints of electric railways for the purpose of locating loose bond connections or breaks in the continuity of the electric conductors. It is well known that it is quite impossible to permanently secure these bonds to the rails, and that they are continually loosening or breaking at different points along the line of railway, thereby materially interfering with the perfect operation of the said railway and producing greater or less loss of power. It is also well known that however well the bond may be secured to the rails, the resistance at the joints always exceeds the normal resistance of the rail, and my invention is particularly adapted to make a comparative test between the electrical resistance of the perfect rail and the joint or meeting ends of two adjacent rails so as to determine whether or not the electrical connection at such joint is up to the standard degree of conductivity of the bond-connection.

Another object of my invention is to produce a comparatively light portable tester which may be carried in the hand from place to place, and contains within a comparatively small space, all the requisite elements for making a comparative test of the resistance of the joint or bond with that of the rail proper, the one device constituting a unitary structure having a tubular handle of small diameter containing all of the elements necessary for the test with the single exception of the receiver which is small and can be carried in the pocket to be attached during the testing operation.

A further object is to equip the device with automatic prick punches which under pressure by the operator, are caused to penetrate any superficial material encountered thereby in making a test so as to obtain more perfect electrical contact with the meeting ends of the rails.

In the drawings—Figure 1 is an elevation, partly broken away, of my improved bond-tester. Fig. 2 is an enlarged longitudinal sectional view, partly broken away, of the upper portion of the handle-tube seen in Fig. 1, showing the upper ends of the primary and secondary coils. Fig. 3 is a similar sectional view of an additional portion of the tubular handle, partly broken away, but in which the primary and secondary coils and make and break contact switch are mounted, the central portion of the primary and secondary coils being broken away. Fig. 4 is an enlarged transverse sectional view, taken on line 4—4, Fig. 1. Fig. 5 is a side elevation, partly broken away of a receiver having an adjustable diaphragm. Fig. 6 is a transverse sectional view through the receiver seen in Fig. 5. Fig. 7 is an elevation of the lower end of the bond-tester shown as applied to the meeting ends of adjacent rails forming parts of an electric circuit. Fig. 8 is a sectional view of one of the prick punches.

In carrying out the objects stated, I provide a tubular metal handle —1— with a suitable foot or oppositely projecting arms —2— in the outer ends of which are located automatic prick punches —3— having spurs or points —4— which are electrically connected by wires —5— to the ends of a primary coil —6— within the tubular handle —1—. The wires —5— are flexibly and electrically connected to the spurs —4— and are passed upwardly from the bottom into the tubular handle —1— where one of them is permanently and electrically connected by a conductor —5'— to one end of a primary coil —6— while the other wire is connected to a switch or make-and-break contact device —7—, one of the terminals of the switch being electrically connected to the other end of the primary coil —6— as best seen in Fig. 3. This primary coil —6— consists of a suitable number of windings or turns of the desired axial length upon a tube —8— of insulating material such as fiber or stiff paper, having its base as —8'— enlarged to fit snugly within the interior of the tube —1— where it is secured or held in fixed relation to the outer tube by suitable fastening means as screws —9—. A portion of the base —8'— of the tube —8— is cut away for receiving and permitting the operation of the movable member as —7'— of the switch —7—, said movable member having a push-button or finger piece —10— secured thereto and projecting through an opening —11— in the outer metal tubular handle —1— where it is accessible by the finger.

The movable switch member —7'— consists in this instance of a spring finger or conductor which is spring-pressed to normally close the switch —7—, the latter being opened by inward pressure upon the push-button —10— to break the circuit through the primary coil —6— when desired.

I preferably provide an extra contact member —12— for the movable member —7'—, such member being also in electrical connection with the same end of the primary coil as the switch —7— through the medium of connecting bonds —13— and forms a stop for the movable member 7' and establishes an additional make and break contact for said member whereby the primary circuit may be more frequently interrupted to increase the number of times that the electro-motive force will rise to a certain value in the secondary circuit and thereby increasing the efficiency of the device; it being noted that the contacts 7 and 12 are sufficiently spaced apart to prevent an accidental short circuiting therebetween.

The electric conductors —5 and 5'— and also the elements of the switch —7— are supported in the insulating base —8'— of the fiber tube —8— in such manner as to prevent electrical connection of said parts with the outer metal tube —1—. The upper end of this insulating tube —8— is provided with an enlarged head —14— which is also snugly fitted within and secured to the metal tube —1—, thereby rigidly holding the primary coil —6— in a fixed position in the tubular handle —1—.

Movable within the insulating tube —8— is a secondary tube —15— of fiber, stiff paper or equivalent material of somewhat greater length than the axial length of the primary coil —6— so as to extend beyond the opposite ends of the latter and a considerable distance below its lower end to guide the tube —15— in its longitudinal movement. This inner tube —15— is secured at its upper end to an enlarged head —16— of insulating material as fiber which is fitted with an easy sliding fit within the tubular handle —1— and to this head is secured by one or more screws —17— a metal washer or disk —18— to which is secured and electrically connected to one end of a core —19— having wound thereon a secondary coil —20—, the central portion of which is broken away in Fig. 3. This secondary coil —20— substantially fills the space between the core —19— and its surrounding insulating tube —15— and its turns are held together by opposite end heads —21— of insulating material, said heads being secured to the core —19—. One end of the secondary coil —20— is electrically connected to the lower end of the core —19— and its other end is electrically connected to a metal conductor —22— extending through the upper insulating head —16— of the sliding tube —15—.

The core —19— and its secondary coil —20— are fixed within the insulating tube —15— to move endwise or axially therewith. A sufficient space is left in the upper end of the outer casing or tubular handle —1— to permit the secondary coil —20— and its core —19— to be drawn upwardly from a position within the primary coil —6— to a position entirely above the latter coil so that the inductive effect of the primary upon the secondary coil may be gradually varied from a maximum to a minimum degree.

A pair of parallel guide-rods 25 are arranged within the tubular handle —1— and have their lower ends screwed or otherwise secured in the insulating head —14— and their upper ends are similarly secured in a cap —26— of insulating material in the upper end of the tubular handle —1— and are electrically connected by conductors —27— to suitable binding posts —28— on the insulating cap —26—.

I have previously stated that one end of the secondary coil —20— is electrically connected to the core —19— which is in electrical contact with the metal disk —18— and through the medium of the screw —17— which engages with said metal disk —18— is electrically connected to a brush —29— on the upper surface of the sliding insulating head —16—, the other end of said secondary coil being electrically connected by a wire —22— to a second contact brush —29'— also mounted upon the upper end of the insulating head —16—. These brushes —29— and —29'— are in sliding electrical contact with the parallel guide-rods —25— and, therefore, the secondary coil —20— is electrically connected through the medium of the brushes —29— and —29'— and metal guide-rods or conductors —25— to the binding posts —28—.

A suitable telephone-receiver —30— or equivalent visual or audible indicator is connected by wires —31— to the binding posts —28—, thereby establishing electrical connection between the receiver and secondary-coil —20—.

The head —16— and secondary-coil —20—, together with its core —19— and tube —15— is moved longitudinally, or up and down by means of a hand-piece —32— having one end inserted in an aperture —33— in the head —16— and its other end passed outwardly through a slot —34— in the tubular handle —1— and provided with a suitable hand-knob —35— and an index finger —36—, which latter is arranged to travel along an index or series of graduations —37— on the tube —1— as the secondary coil is moved longitudinally.

The inner end of the socket —33— in the head —16— is enlarged to receive a retracting spring —38— and a nut —39— against which the spring —38— abuts and operates to force the plunger —32— inwardly or axially so as to frictionally engage the head of the plunger or index fingers —36— with the outer face of the tube to hold the secondary coil and parts moved therewith in their adjusted position with reference to the outer tubular casing or handle —1—, the nut —39— being adjustable to vary the tension of the spring —38— for the purpose of increasing the friction between the head of the plunger and outer tube when desired.

The scale —37— is calibrated approximately to a known resistance, as for instance, the known resistance of a standard rail, which in this instance corresponds to a reading slightly above zero so as to allow for slight variations in the rail resistance, according to varying densities of different parts of the rail.

In testing the electrical leakage or resistance of the joints or bonds connecting the joints of adjacent rails, the foot of the handle —1— is made to span such joint so that one of the spurs —4— rests upon the adjacent end of each of the rails, whereupon the device is pressed downwardly with sufficient force to operate the prick punch —3— to cause the spurs —4— to penetrate any ordinary scale or dirt which may be on the surface of the rail, thereby establishing a more perfect electrical connection between the spurs and rails. If there is no leakage of the current at the joint, such as would be produced by a broken or loose bond, there would be very little if any current flowing in the primary coil —6—, and therefore, the induced current in the secondary coil would be insufficient to produce any audible sound in the receiver, it being understood that by making and breaking the primary circuit through the medium of the switch —7— and contact member —12— the electromotive force of any slight current which might flow in the primary circuit would be magnified in the secondary circuit, the effect being similar to that produced by the ordinary vibrator of a spark coil. On the other hand, if the bond was broken, or the continuity of the circuit was incomplete through the rail there would be a leakage of the current through the primary coil which would be induced into the secondary coil and cause more or less audible disturbance in the receiver —30—, which of course, is held to the ear while the test is being made. If this audible disturbance in the receiver is sharp and well defined, it indicates that the break at the joint or bond is excessive and by withdrawing the secondary coil gradually upward and out of the field of the primary coil until the disturbance can no longer be detected by the receiver, the comparative degree of electrical resistance may be accurately determined by the location of the index finger —36— with reference to the graduations on the scale —37—. For example, if the adjustment of the secondary coil necessary to bring the audible disturbance to a minimum is slight it indicates that the bond or electrical connection at the joints is only slightly imperfect, whereas if the adjustment is excessive it indicates a correspondingly excessive break in the continuity of the circuit at the joint.

In Figs. 5 and 6 I have shown a receiver —30— as provided with an adjustable cap —40— in which is seated the usual diaphragm —41—, the latter being locked in the cap —40— by a screw threaded ring —42—, best seen in Fig. 6 so that by rotating the cap in one direction or the other it is moved endwise and carries with it the diaphragm —41— toward and from the electromagnets, as —43—. This principle of adjusting the diaphragm relatively to the magnets may also be used independently of the adjustment of the secondary coil —20— to test excessive leakages or imperfect electrical connections at the joints of the rails or bonds bridging such rails. For example, the action of the diaphragm will obviously be more sensitive to slight leakages at the joints when close to the magnets, and by unscrewing the cap —40— so as to gradually draw the diaphragm away from the poles of the magnet this sensitiveness gradually decreases, and if the current leakage is excessive the diaphragm may be drawn outwardly by unscrewing the cap until the electrical effect, or audible disturbance of the magnets upon the diaphragm is lost. I have, therefore, calibrated the rotary part or cap of the receiver and its base to indicate the comparative conductivity of the standard rail with varying degrees of leakage at the joints or bonds, taking the most perfect electrical connection of a bond as a standard or zero when the diaphragm is normally close to the pole-pieces of the magnet.

As seen in Fig. 5, the base as —44—, of the receiver is provided with a series of graduations —45— indicating the degree of endwise adjustment of the cap for each revolution, said cap being also provided with a series of graduations —46— adapted to be brought into registration with a fixed point or line —47— on the base —44— to indicate the degree of leakage of the current as compared with the normal conductivity of the perfect bond. For example, if there was an excessive leakage of current at the joint it would pass through the electromagnets —43— when the secondary coil —20— is within the primary coil —6— because the receiver is connected directly to the secondary coil and derives current therefrom. If this leakage is sufficient to produce a disturbance of the diaphragm —41—, the cap —40— may be rotated or unscrewed thereby moving the diaphragm —41— away from the pole pieces of the magnet until the audible disturbance of the diaphragm is lost or imperceptible when the receiver is held to the ear, the degree of such adjustment of the diaphragm being indicated by the graduations —46—, which also indicates the amount of leakage as compared with the normal conductivity of the bond connection and enables the operator to determine whether it is advisable to readjust or connect the bond so as to produce a better electrical connection between the rails. This adjustment of the diaphragm with reference to the pole-pieces of the magnet serves substantially the same purpose as the adjustment of the secondary coil —20— with reference to its primary coil —6— and enables the operator to make the test either by adjustment of the coil —20—, or by adjustment of the diaphragm —41— of the receiver, the latter being sufficient for ordinary work, while the former, or adjustment of the coil, enables the detection of comparatively slight leakages or imperfect bonds.

In Fig. 7 I have shown my improved bond tester as applied to the meeting ends of rails —a— connected by a bond a', said rails being shown in an electric circuit —w— with a dynamo —d—; the latter being shown diagrammatically in said Fig. 7.

In the sectional view of the prickpunch shown in Fig. 8 it will be noted that the spur 4 is held within the tapering holder 50 which is screw-threaded within the lower end of the main casing 51 of the punch, which casing is in turn screw-threaded within an aperture positioned adjacent the free end of the foot or arm 2. Said spur is provided with an encircling helical spring 52 provided within the chamber 53 of said holder which cushions said spur. The main casing 51 being tubular and having the usual block 54, spring 55 and the other usual element found in such device positioned therein.

Having thus described my invention, what I claim:

1. In a device of the class described, a tubular handle provided with projecting feet, contact terminals secured to the free ends of said feet, a tube of insulating material, a primary coil wound upon said tube and closely fitting within said handle, and securing means for fixedly positioning the same therein, said coil being positioned in spaced relation from the top of said handle, an insulated extension provided on the bottom of said coil, conductors extending through said extension, and electrical connectors between said conductors and said contact terminals, means for making and breaking the circuit between the primary coil and said terminals, a secondary coil slidable longitudinally within the primary coil, rod conductors, said secondary coil provided with spring terminals in contact with the rod conductors, binding posts positioned on the top of said handle, conductors between said rods and binding posts, means for communicating the degree of adjustment of the sliding coil, and a receiver in electrical connection between said binding posts.

2. In a device of the class described, a tubular handle provided with projecting feet, contact terminals secured to the free ends of said feet, a tube of insulating material, a primary coil wound upon said tube and closely fitting within said handle, and securing means for fixedly positioning the same therein, said coil being positioned in spaced relation from the top of said handle, an insulated extension provided on the bottom of said coil, conductors extending through said extension, and electrical connectors between said conductors and said contact terminals, said extension provided with a cut away portion at one side thereof, a resiliently-mounted make and break switch positioned in said cut away portion and in circuit between the primary coil and one of said contact terminals, a secondary coil slidable longitudinally within the primary coil, and a receiver in circuit with the secondary coil.

3. In a device of the class described, a tubular handle provided with projecting feet, contact terminals secured to the free ends of said feet, a tube of insulating material, a primary coil wound upon said tube and closely fitting within said handle, and securing means for fixedly positioning the same therein, said coil being positioned in spaced relation from the top of said handle, an insulated extension provided on the bottom of said coil, conductors extending through said extension, and electrical connectors between said conductors and said contact terminals, said extension provided with a cut away portion at one side thereof, a resiliently-mounted make and break switch positioned in said cut away portion and in circuit between the primary coil and one of said contact terminals, a secondary coil slidable longitudinally within the primary coil, said secondary coil provided with a core and one terminal of said coil in contact therewith, two spring contacts positioned upon the upper end of the secondary coil, one of said contacts in circuit with said core and the other contact connected with the other terminal of said coil, rods positioned interiorly and longitudinally of said handle and oppositely-arranged, said spring contacts having slidable connections with said rods, and a receiver in circuit with said rod.

4. In a device of the class described, a tubular handle provided with projecting feet, contact terminals secured to the free ends of said feet, a tube of insulating material, a primary coil wound upon said tube and closely fitting within said handle, and securing means for fixedly positioning the same therein, said coil being positioned in spaced relation from the top of said handle, an insulated extension provided on the bottom of said coil, conductors extending through said extension, and electrical connectors between said conductors and said contact terminals, said extension provided with a cut away portion at one side thereof, a resiliently-mounted make and break switch positioned in said cut away portion and in circuit between the primary coil and one of said contact terminals, a secondary coil slidable longitudinally within the primary coil, said secondary coil provided with a core and one terminal of said coil in contact therewith, two spring contacts positioned upon the upper end of the secondary coil, one of said contacts in circuit with said core and the other contact connected with the other terminal of said coil, rods positioned interiorly and longitudinally of said handle and oppositely-arranged, said spring contacts having slidable connections with said rods, and a receiver in circuit with said rods, said handle provided with a longitudinal slot above the primary coil, a head provided upon said secondary coil, a spring pressed hand-piece carried by said head and projecting through said slot, an index finger provided upon said hand piece and graduations provided upon said handle adjacent said slot.

In witness whereof I have hereunto set my hand this 17th day of January 1906.

JOHN B. WEST.

Witnesses:
H. E. CHASE,
MILDRED M. NOTT.